(No Model.)
F. B. RAE.
SAFETY CUT-OUT.
No. 422,354. Patented Feb. 25, 1890.
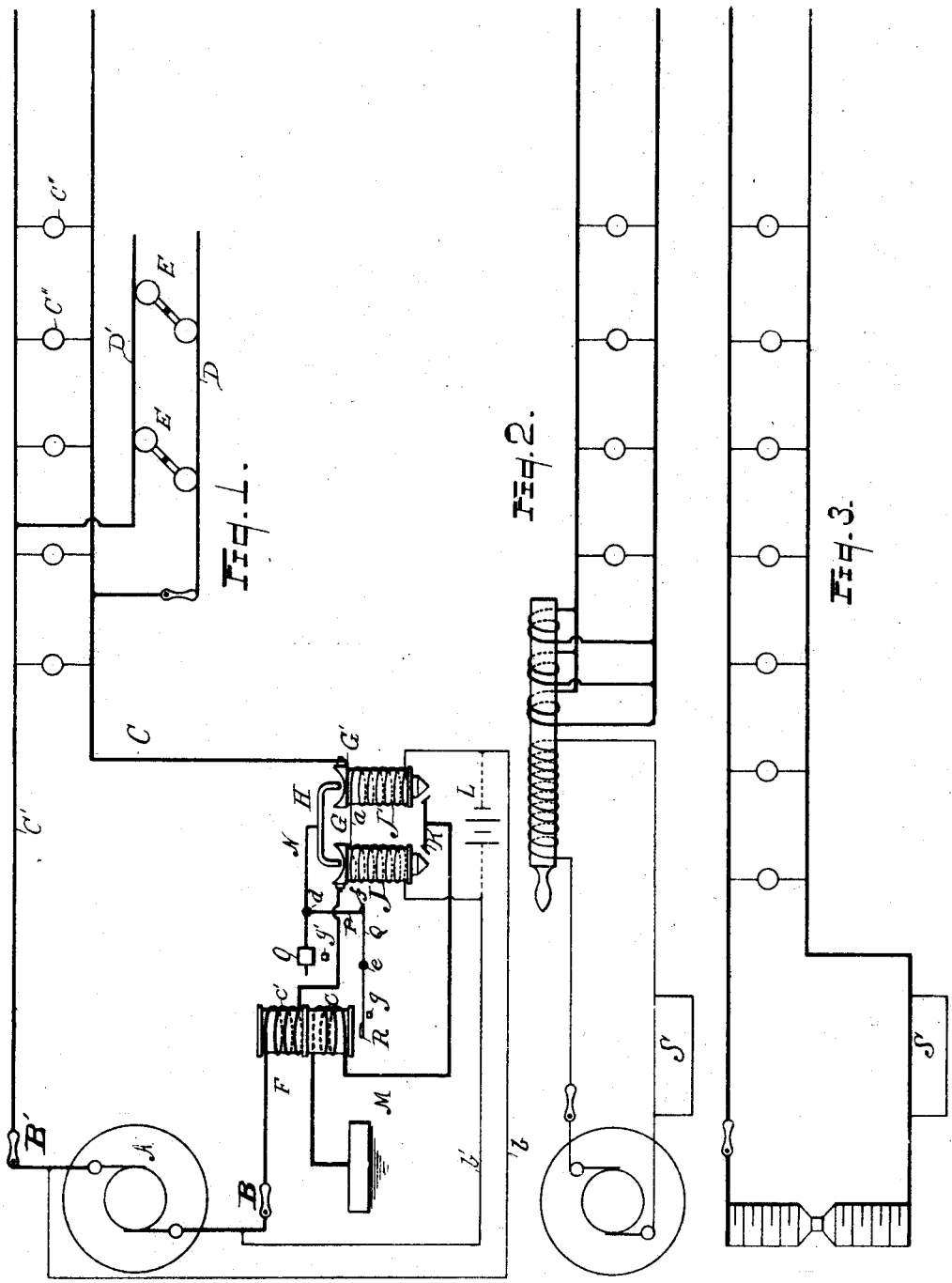
WITNESSES
INVENTOR
Frank B. Rae

UNITED STATES PATENT OFFICE.

FRANK B. RAE, OF DETROIT, MICHIGAN.

SAFETY CUT-OUT.

SPECIFICATION forming part of Letters Patent No. 422,354, dated February 25, 1890.

Application filed June 13, 1889. Serial No. 314,165. (No model.)

*To all whom it may concern:*

Be it known that I, FRANK B. RAE, a citizen of the United States, residing at Detroit, in the county of Wayne and State of Michigan, have invented certain new and useful Improvements in Safety Appliances for Dynamos and Analogous Machines; and I do hereby declare that the following is a full, clear, and exact description of the invention, which will enable others skilled in the art to which it appertains to make and use the same.

My invention relates, in general, to safety appliances for dynamos and analogous machines, but more particularly has relation to a combined limit-switch and lightning-arrester for the working-circuit of an electric generator. The limit-switch is in the nature of an automatic cut-off, and is designed to limit the current passing through the working-circuit to a certain strength, (ampères,) which strength is the normal full load, so that in event of an increase in the current strength, due to a short circuit in the line or other contingency, the said limit-switch will exercise its function as an automatic cut-off and break the circuit with the dynamo, thereby protecting the latter from the injurious effects of a short circuit.

In connection with my improved limit-switch I arrange and combine a peculiar and operative lightning-arrester, so placed and constructed that any static discharge, whether induced by lightning-flashes or from direct discharges from the clouds to the main line, cannot affect or reach the dynamo, but, on the other hand, is deflected from the working-circuit to the ground. This lightning-arrester is placed in a branch from the main line to the ground, which branch includes a dielectric (air-space) serving to interrupt the continuity of said branch, so that the working-current traversing the main line cannot reach the ground through said branch—that is to say, the electro-motive force of the working-current is insufficient to establish a path over the dielectric in the form of an arc, whereas the great electro-motive force of the static discharge, being opposed in the main line by the counter electro-motive force of the working-current, will be deflected through said branch to the ground, and will also in such event leap over the dielectric, and at the same time tending to form an arc thereover. If an arc is established in the branch over the dielectric, there will be formed a path from the working-circuit to the ground for the working-current.

In order to preclude the possibility of the establishment of any arc in the ground branch, I provide means for disrupting and annihilating the same instantaneously with its appearance, so that the static discharge is permitted to go to the ground in its leap over the dielectric, while the working-current is confined to the main line. As an additional precaution, however, I have provided means for breaking the main line with the dynamo in event of an arc being formed over the dielectric in defiance of the disrupting device, whereby the dynamo is cut off simultaneously with the escape of the working-current to the ground through the path made by the arc.

In the accompanying drawings I have shown my invention theoretically or diagrammatically applied to a number of different purposes, not deeming it necessary to illustrate or describe the detailed construction of minor features, since they form no component part of the novelty hereof.

Referring to the drawings, Figure 1 is a diagrammatical view showing my invention complete and as applied to a continuous-current generator feeding a working-circuit including translating devices. Figs. 2 and 3 are similar views illustrating, respectively, two other forms or modifications of my invention.

Like letters of reference mark the same or corresponding parts in the several views of the drawings.

Referring to Fig. 1, A represents a dynamo-electric generator of continuous type, feeding the working-circuit C C', which in turn supplies various translating devices in parallel. In this particular instance the main working-circuit includes incandescent lamps C'' C'', while the multiple-arc branch D D' feeds traveling electric motors E E. The dynamo A is provided with all necessary circuit-connections, switches, &c., while the two working-circuits fed thereby are respectively furnished with switches B B'.

The outgoing conductor C of the main circuit includes in series one helix or coil of the differentially-wound electro-magnet F, and extends on in series through the mercury-cups G G' and bridge H to the line. Each mercury-cup G or G' is formed in the upper end or face of one of the poles of the two electro-magnets J J', and is permanently in circuit with the outgoing conductor C by suitable binding-posts or other mode of connection, as shown clearly in Fig. 1. The two electro-magnets J J' are placed the requisite distance apart to correspond with the width of the movable bridge H, so that the latter will make contact at each end with the mercury in its respective cup. The two lower poles of these two magnets project vertically downward and terminate in the same horizontal plane as the electrode K, placed transversely between said lower poles and separated at each end from one of the latter by a dielectric (air-space.) Thus it will be seen that the iron core of each magnet J or J' is an electrical conductor for the working-current to the extreme end thereof. The upper terminals of the two helices of the magnets J J' are connected by the wire $a$, while the two lower terminals are respectively in circuit with the dynamo through a shunt consisting of the conductors $b\ b'$. By this arrangement of the multiple-arc shunt $b\ b'$ it will be seen that as long as the dynamo A is generating current the coils of the electro-magnets J J' will be energized, and there will be magnetism at the lower poles of said magnets, radiating its lines of force over the air-space separating said poles from the electrode K.

Instead of employing the dynamo A as the energizing source for the magnets J J', as just described, I may utilize any other suitable or convenient source of electricity independent of the dynamo A—such, for instance, as that shown at L, Fig. 1.

As before stated, the magnet F consists of two cumulative coils $c\ c'$, the coil $c'$ serving to carry the full strength of the working-current without attracting its armature, and the other coil $c$ being similarly arranged on the lower part of the core and connected in circuit with the ground branch M, so that if the working-current flowing through the upper coil $c'$ should find a short circuit to the ground through the branch M the re-enforced energizing influence of both coils $c\ c'$ will be sufficient to magnetize the core, causing the same to attract its armature and break the circuit, as will be understood by the explanation hereinafter.

The bridge H is attached centrally, as shown, to a horizontal weighted lever N, pivoted at the point $d$ and carrying at its rear extremity the releasing-weight O, which serves to uplift the bridge H out of the mercury-cups when permitted to exercise its pressure. At or near its fulcrum-point the lever N is provided with a downwardly-extending stud or finger P, having its free lower end depending in proximity to the armature-detent Q, which in turn is pivoted at $e$ and carries at its rear end the armature R, and at its forward extremity a catch $f$, which retains the finger P, and consequently the lever N and bridge H, in proper position until released.

$g\ g'$ respectively indicate limiting stops or pins for the lever N and the armature-detent Q. Thus it will be readily seen that if the armature R is attracted by its magnet F the detent Q will be actuated to release the finger P from the retaining agency of the catch $f$, thereby permitting the weight O to disengage the bridge H from contact with the mercury of the mercury-cups.

The operation of the devices hereinbefore described may be briefly set forth as follows: Should there be a short circuit in the main-line arising from whatever cause the ampères of current will be proportionately increased and the short-circuiting of the dynamo will be prevented by the magnet F attracting its armature R, and thereby breaking the continuity of the working-circuit by the removal of the bridge H from contact with the mercury. Such open-circuiting of the line will be an immediate notification to the attendant in charge that the cut-off has been operated by such contingency. After the cause of the short circuit has been duly remedied the bridge H is replaced and the switch again set for operation. On the other hand, if lightning should enter the line, it will in its effort to reach the dynamo A through the line be met and opposed by the electro-motive force of the working-current to such a degree that it will endeavor to escape such impediment or resistance when it reaches the mercury-cups by traversing the cores of the magnets J J' and leaping over the dielectric to the electrode K, from whence it will pass to the ground over the branch M. In its leap over the air-space at the electrode K it will, as before stated, tend to form an arc thereat, which will be dissipated entirely by the presence of the magnetism at the ends of the lower poles of the magnets J J', as is well known, thus preventing the formation of a continuous path for the working-current to the ground. However, should the magnetic effect fail to disrupt the arc formed by the static discharge and the working-current thereby escape to the ground through the branch M, the two coils $c\ c'$ of the magnet F will carry a current so much stronger than the normal load that its core will be sufficiently energized to cause the attraction of its armature R and the consequent open-circuiting of the line.

It will be understood that the form and construction of the switch mechanism may be varied and changed at will to suit requirements without deviating from the spirit of my invention.

In Fig. 2 I have shown my invention applied for use in connection with a system of distribution and transformation, wherein the combined limit-switch and lightning-arrester are placed in the primary circuit between the dynamo and the primary coils of the inductorium. In the said figure I have not illustrated the full details of the said switch, since it is unnecessary. The box S is intended to theoretically represent the construction shown in Fig. 1.

In Fig. 3 a main circuit fed by a secondary or storage battery is equipped with my invention. In this instance, also, the switch is shown by the box S.

Having thus fully described my invention, what I claim, and desire to secure by Letters Patent, is—

The combination, with a circuit-controller included in an electric circuit, consisting of a bridge having two terminal points adapted to make and break contact with terminals of said circuit, of a system of levers placed in operative relation to said circuit-controller, an electro-magnet and armature for operating said system of levers, said electro-magnet being included in the main circuit, a branch electric circuit, including a dielectric and extending from the working-circuit to the ground, and including a coil co-operating with the aforesaid electro-magnet, all arranged to operate substantially as described.

In testimony whereof I have hereunto set my hand this 20th day of May, 1889.

FRANK B. RAE.

Witnesses:
ALICE STANTON,
C. A. THEIS.